United States Patent [19]
Speth et al.

[11] 3,848,171
[45] Nov. 12, 1974

[54] ARRANGEMENT FOR THE OPTIMUM SETTING OF THE ROTOR BLADES OF WATER TURBINES

[75] Inventors: Winfried Speth; Fritz Loffelmann, both of Erlangen, Germany

[73] Assignee: Siemens Aktiengesellschaft, Munchen, Germany

[22] Filed: Dec. 29, 1972

[21] Appl. No.: 319,733

[30] Foreign Application Priority Data
Dec. 30, 1971   Germany............................ 2165635

[52] U.S. Cl....................... 318/561, 290/52, 415/17
[51] Int. Cl. ............................................ G05b 11/32
[58] Field of Search .............. 415/13, 15, 17, 1, 42, 415/43; 290/40, 43, 52, 54; 318/560, 561

[56] References Cited
UNITED STATES PATENTS

| | | | |
|---|---|---|---|
| 1,901,771 | 3/1923 | Pfau | 415/17 |
| 1,901,776 | 3/1933 | Ring | 415/43 |
| 2,265,952 | 12/1941 | Montgomery | 415/43 |
| 2,986,646 | 5/1961 | Ding | 290/52 X |
| 3,118,281 | 1/1964 | Gros | 415/17 |
| 3,655,954 | 4/1972 | Speth | 318/561 X |

FOREIGN PATENTS OR APPLICATIONS

| | | | |
|---|---|---|---|
| 1,227,368 | 4/1971 | Great Britain | 415/13 |
| 1,228,445 | 4/1971 | Great Britain | 415/17 |
| 1,104,456 | 4/1961 | Germany | 415/15 |

*Primary Examiner*—Robert K. Schaefer
*Assistant Examiner*—W. E. Duncanson, Jr.
*Attorney, Agent, or Firm*—Kenyon & Kenyon Reilly Carr & Chapin

[57] ABSTRACT

The gain factor of the transfer function between the angle of the rotor blades and the efficiency of a water turbine is identified, and by means of an extreme value regulator and adjustment of the rotor blade angle, the gain factor is adjusted to zero, thereby automatically determining optimum efficiency of the turbine for a given set of operating parameters.

5 Claims, 4 Drawing Figures

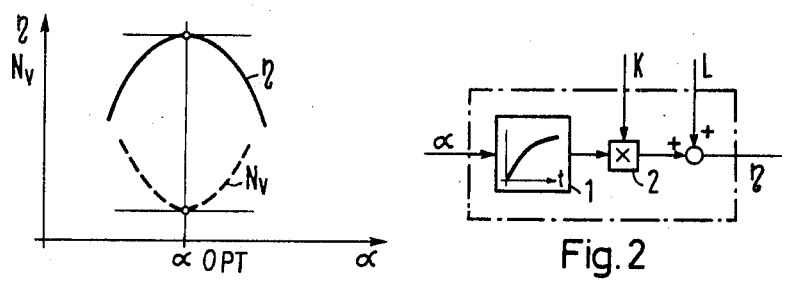
Fig. 1
Fig. 2
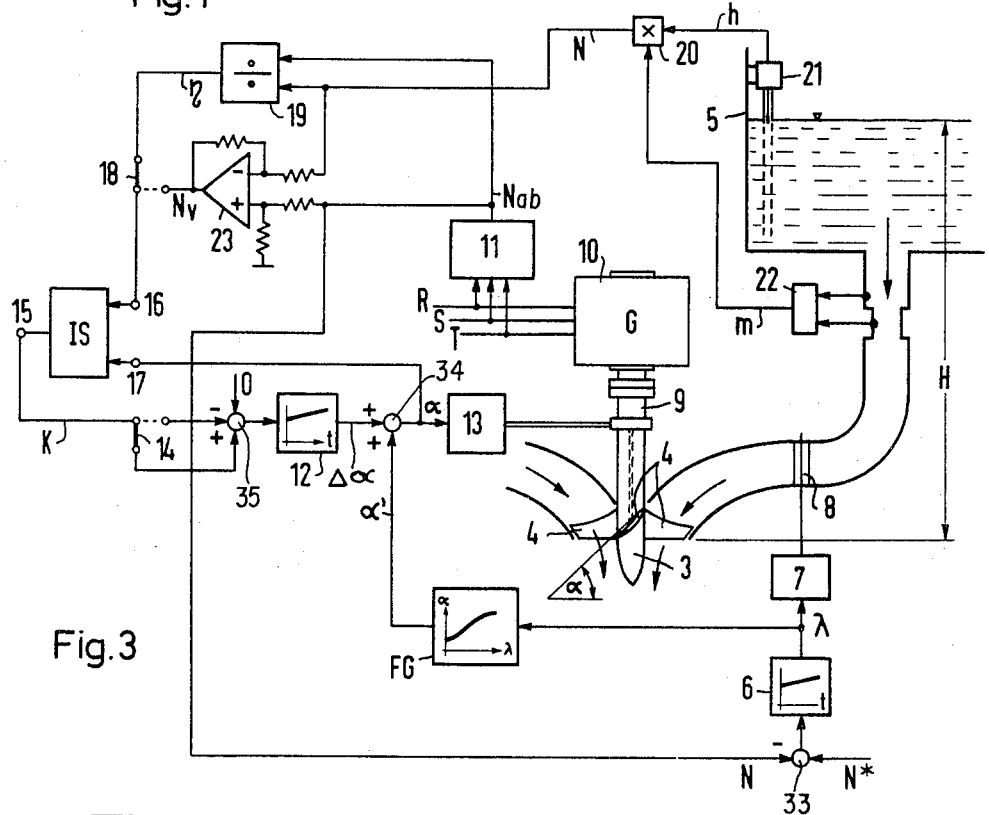
Fig. 3
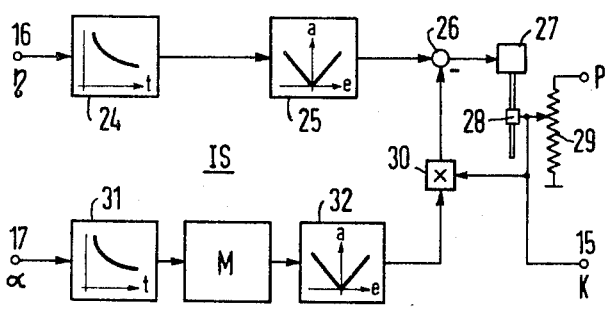
Fig. 4

3,848,171

ARRANGEMENT FOR THE OPTIMUM SETTING OF THE ROTOR BLADES OF WATER TURBINES

BRIEF SUMMARY OF THE INVENTION

The present invention relates to an arrangement for the optimum setting of the rotor blades of water turbines. Up to the present time, for the purpose of obtaining good efficiency, the usual thing was a manual adjustment of the angle to which the rotor blades were set, or was a fixed association between the rotor blade location and the angle of incidence of the rotor blades, whereby, however, a series of empirically determined relationships had to be taken into account between the individual operational parameters, such as, for example, the volume of throughput, the water head, or specified electric output of the water turbine. This made necessary a routine but not simple new adjustment at every change of the operational parameters, and in most cases the optimum efficiency was not even reached. The problem of the invention is to produce automatically at any change of the operational parameters, the rotor blade setting associated with the optimum efficiency of the water turbine.

This problem was solved in that, for the purpose of determining the gain factor between the rotor blade setting and the efficiency or the power loss of the turbine, there is provided a known identification circuit whose output magnitude is conducted as an actual value to an extreme-value regulator, whose output signal adjusts the rotor blades through the intermediary of an adjusting mechanism. As an identification circuit there can be used hereby a known arrangement in connection with the adaptive regulation of rotary speed, or even a known circuit, as disclosed in U.S. Pat. application Ser. No. 885,691 now Pat. No. 3,655,954 the text of which is incorporated herein by reference and constitutes part of this disclosure. This patent describes a circuit which may be used to represent the transfer function within a controlled system, particularly with regard to its gain factor. and comprises a storing quotients former, to whose divisor input a signal is supplied from a lead circuit, i.e., a differentiating circuit as well as a circuit simulating the transfer function of the controlled system, whereby the quotients former itself is made in the form of an integrator coupled with a multiplier. A long time constant for the storing quotients former is provided when the integrator consists of a servomotor which is mechanically coupled to the sliding wiper of a potentiometer connected to a constant voltage. Great accuracy results when in another way of carrying out the invention the extreme value regulator has integral behavior. It has proved to be advantageous when a precontrol of the rotor blade setting is effected, in that, in accordance with a further characteristic of the invention, the adjusting means is also acted on by a magnitude that influences the rotor blade setting. In this way it is also possible to master certain special operational conditions perfectly, for example when starting up.

DESCRIPTION OF THE DRAWINGS

FIG. 1 is a graphical plot of turbine efficiency vs. rotor blade angle as well as a plot of power loss vs. rotor blade angle;

FIG. 2 shows in schematic form the zone circuit of the water turbine;

FIG. 3 is an overall schematic of the circuitry according to the present invention; and FIG. 4 is a more detailed schematic circuit diagram of the identification circuit IS of FIG. 3.

DESCRIPTION OF THE PREFERRED EMBODIMENT

In FIG. 1 the solid line curve shows the relationship of the efficiency $\eta$ to the water turbine of the angle $\alpha$ at which its rotor blades are set. This dependence is valid for a certain set of operational parameters. When these change, then the pattern of the efficiency curve will also change; however in every case, at an eventually different angle $\alpha_{opt}$ of the rotor blade, the efficiency curve reaches a maximum. In the controlled system 3, this is defined as an operating point where the gain factor of the control system, i.e., the gain factor between the rotor blade setting or angle $\alpha$ and the efficiency, is zero. In other words, an incremental change in blade setting will result in no further increase in efficiency. This is the well known case in calculus where the differential is set to zero to find a maximum. For such an operative point with maximum efficiency, then the power loss $N_v$ of the water turbine would be a minimum, as shown by the pattern of the dotted line power loss curve. This condition of minimum power loss similarly is represented by setting the differential $d\alpha/dN_u$ to zero. The location of the optimum operative point, corresponding to $\alpha_{opt}$, can now vary greatly because of the aforesaid operational parameters.

FIG. 2 illustrates a circuit arrangement which represents the transfer function of the controlled system, i.e., the water turbine. It has the angle $\alpha$ of the rotor blade setting as an input magnitude, and the efficiency $\eta$ of the water turbine as the output magnitude. A time constant element 1 represents the mechanical and/or electrical inertia of the adjusting device. As shown, the output of element 1 is multiplied in a multiplier 2 by the gain factor K of the controlled system. In addition, the output of the multiplier is shown as being acted upon by a distrubance L. This disurbance L is a constant which is added to the output of multiplier 2. Such a representation of a controlled system by an analog circuit such as that in FIG. 2 is well known in the art and is explained in more detail in the above referenced U.S. application. As noted above, both the gain factor K and the disturbance L will change with changes in turbine operation.

FIG. 3 shows a Kaplan turbine having rotor blades 4, which are impinged by water from a elevated water reservoir 5. An input value N* which represents the desired output power of the system is provided to a summing junction 33 where it is compared with an actual power output value $N_{ab}$ which is obtained in a manner to be explained below. The difference obtained at summing junction 33 is used as an input to a controller 6 which will in well known fashion comprise an integrator. The output of the controller 6 designated as $\lambda$ is used as a control quantity for both controlling the blade angle $\alpha$ and for controlling the flow of water into the turbine blades. Control of the flow is through a conventional valve 8 which is operated by a control means 7 such as an electro-hydraulic control means in accordance with the output signal $\lambda$. In well known fashion, as more power is demanded, and the value of N* increases, the valve 8 will be opened more to cause greater amounts of water to impinge on the turbine blades 4. λ is also provided as an input to a function generator designated FG which provides for a coarse adjustment of the setting angle α. The output of this block, designated α' is provided to a summing junction 34 at the input to an adjusting device 13 which adjusts the turbine blade angle in well known fashion. The rotor blades 4 are mechanically coupled to a turbine shaft 19 which is coupled to a three phase generator 10 which supplies power to a three phase network having phases designated as R. S. and T. At its output terminals there is connected, to detect the output in watts, a wattmeter instrument 11, whose output magnitude $N_{ab}$ forms the actual value provided to the power regulator 6 through summing junction 1.

The output of function generator FG only adjusts the rotor blades to approximately the proper setting. (In prior art systems, this adjustment was done in a more or less manual manner as described above.) It should be noted at this point that the portions of the system so far described are known in the prior art. The present invention, in order to produce the needed electrical power N* at the maximum efficiency η possible, provides a regulator 12, whose output magnitude Δ. The value Δα is summed with the value α' from the function generator FG to obtain a final value α which is the input to the adjusting device 13. As shown and as will be explained in more detail below, this final value α is used as a feed-back value to a circuit for determining maximum efficiency so that the value Δα will be continually adjusted so as to provide, when added to α' an output α resulting in the maximum turbine efficiency. The function generator may comprise a known arrangement of biased threshold-value diodes, and, as noted above, there is such an relationship between its input magnitude λ and its output magnitude α' that a reliable, if not optimum operation, is ensured. As noted above, optimum efficiency occurs when the gain factor K is equal to zero. Thus, at the input to the regulator 12, there is a summing junction 35 which has a reference input the value zero. The second input to the summing junction is a value K obtained from an identification circuit designated is to be explained in more detail below. The output K is provided through a switch 14 which permits it to be connected either as a negative input or as a positive input. As shown, it is connected to the positive input of the summing junction 35. This is the connection when operating so as to maximize the efficiency η when operating so as to minimize power loss, $N_v$, the switch will be in the position not shown to connect the output of circuit IS to the negative input of summing junction 35 as will be described more fully below. The indentification circuit IS has as inputs the value α from the summing junction 34 at an input terminal 17 and the value of efficiency η from a dividing circuit 19 through a switch 18 to the terminal 16. Again, as will be explained below, switch 18 may be placed in the position not shown to provide value $N_v$, as a second input. Obviously, switches 14 and 18 will be operated together. The circuit IS essentially is a circuit for finding the gain factor K from the quantities α and η in accordance with the transfer function of FIG. 2. Its operation will be explained in more detail below. Again, circuits of this nature are disclosed in the above referenced U.S. patent and are well known in the art. The divider 19 which provides the input to terminal 16 of the identification circuit has as one input the output $N_{ab}$ of the wattmeter 11. This represents the actual power delivered. Its second input is a value $N^1$ obtained from a multiplier 20. This value represents the power input to the turbine and is obtained by multiplying the height of fall H as measured by a water level indicator 21 by the rate of flow m measured by a flow meter 22. This flowmeter is constructed as a so called pressure-differential meter, and it makes use of the difference of pressure, occurring as the water flows through, between a normal and a contracted cross-section of pipe. The product of the head and quantity flowing through is proportional to the power input. Thus, in well known fashion, the power output $N_{ab}$ divided by the power input $N^1$ provides an output from divider 19 which represents the efficiency.

In this manner the gain factor K will be provided as an input to the regulator 12 which in response to this input will change its output value adjusting the angle through the adjusting device 13 until the value of α fedback to the input 17 results in a value K equal to zero. The output of controller 12 which in conventional fashion will be an integrating device will then remain fixed at that point until a change in operating parameters occurs resulting in values for efficiency and blade setting which cause the value K to again change. In conventional fashion, the integrator 12 will then integrate up or down to re-establish the proper operating point. Since the regulator 12 in this manner adjusts the angle α to power is delivered at its greatest efficiency, the regulator 12 may be referred to as an extreme value regulator.

If the circuit bridges designated 18 and 14 are brought into their horizontal position, then there is supplied to the input terminal 16 of the identification circuit a voltage $N_v$, which is proportional to the power loss of the unit, and which is determined as the difference between the power input and the power output. That is, the output $N_{ab}$ from the wattmeter 11 representing the power output is provided to the non-inverting input of an amplifier 23 and the output of multiplier 20, $N^1$ representing input power to the inverting input of amplifier 23. Thus amplifier 23 will, in conventional fashion, have an output equal to the difference between the input power and output power or in other words, the power loss. With the switches 14 and 18 in the position not shown, the power loss $N_v$ is provided as the second input to the identification circuit. The gain factor K is not provided as a negative input to the summing junction 35 to reverse the direction of regulation to adjust the angle α so that the rotor blades are set to a position where the power loss $N_v$ is a minimum, again establishing an optimum operating point. Thus, the circuit can adjust to an optimum point either based on efficiency or power loss, since as shown on FIG. 1, the optimum angle α is at a point where efficiency is a maximum and power loss is a minimum.

FIG. 4 shows more specific details of the construction of the identification circuit 18. The input terminal 16 is connected, over a lead 24 i.e., a differentiating circuit and a absolute value circuit 25, connected with a summing junction 26, for example in the form of an operation-amplifier. The output from the mixer 26 acts on a servo-motor 27, which by means of a spindle nut 28 displaces the sliding wiper of a potentiometer 29, connected to a constant direct current voltage P, when the output signal from the mixer 26 has a value different from zero. From the point of view of control thereof, this servo-motor thus represents an integrator having the property of being able to store for as long as desired its output signal in the absence of an input signal. This integrator has a feed-back coupling by means of a multiplier 30. At the other input of this multiplier there acts, over a second lead circuit 31 and a circuit M simulating the controlled system, i.e., the turbine and a absolute value circuit 32 35, a magnitude $\alpha$ proportional to the angle at which the rotor blades are set. The circuit M simulating the controlled system is a complete model of the controlled system situated between $\alpha$ and $\eta$; but it is not however subjected to the influence of external disturbing magnitudes. That is to say, the output of the circuit 25 will be a value proportional to $d\eta$. The output of the lead circuit 31 is passed through the simulating circuit M which is essentially similar to the block 1 of FIG. 2. As the effect of the disturbance L, which can be considered as a constant, is eliminated by the differentiating action of the lead circuit 24, the output values of the absolute value circuits 25 and 32 differ only by the gain factor K and by dividing these output values in the dividing circuit consisting of the before described elements 26-30, a value equaling the gain factor K is provided at the output terminal 15.

As noted above, circuits such as that on FIG. 4 are known in the art and are described in the aforementioned U.S. application.

We claim:

1. In a water turbine, apparatus for optimizing the turbine efficiency comprising:
   a. means to develop a first output signal representative of power output by the turbine;
   b. means to develop a second output signal representative of power input;
   c. means to develop from said first and second signals a third signal representing one of the efficiency and power loss of the turbine;
   d. means having as one input one said third signal and as a second input, a fourth signal representing the angle of the rotor blade setting to develop a fifth signal representing the gain factor within the turbine; and
   e. means, having said fifth signal as an input, to control the turbine blade setting such as to cause said gain factor to become zero.

2. The invention according to claim 1 wherein said means for controlling said turbine blades comprise an adjusting device obtaining its input from a control circuit having integral action.

3. The invention according to claim 1 wherein said means for determining gain factor includes an integrator circuit which comprises a servo motor mechanically coupled to the sliding wire of a potentiometer which is supplied with a constant voltage with the output voltage of said potentiometer representing said gain factor.

4. The invention according to claim 3 and further including means for providing a coarse adjustment of said turbine blade setting.

5. The invention according to claim 4 wherein said means for providing a coarse adjustment comprises means responsive to the difference between desired and actual power, providing a sixth signal as an output and function generator means having said sixth signal as an input and providing a seventh signal as an output and means to sum said seventh signal with said fifth signal at the input of said adjusting device.

* * * * *

UNITED STATES PATENT OFFICE
CERTIFICATE OF CORRECTION

PATENT NO. : 3,848,171
DATED : November 12, 1974
INVENTOR(S) : Winfried Speth, Fritz Löffelmann It is certified that error appears in the above-identified patent and that said Letters Patent are hereby corrected as shown below:

In column 4, line 29, change "angle $\alpha$ to power is delivered at its greatest efficiency" to -- angle $\alpha$ to the optimum operating point as shown on Fig. 1, so that the electrical power is delivered at its greatest efficiency--

In column 4, line 67, change "thereof" to --theory--

Signed and sealed this 15th day of April 1975.

(SEAL)
Attest:

RUTH C. MASON
Attesting Officer

C. MARSHALL DANN
Commissioner of Patents
and Trademarks